United States Patent [19]
Auger et al.

[11] Patent Number: 6,012,507
[45] Date of Patent: *Jan. 11, 2000

[54] APPARATUS AND METHOD FOR MEASURING THE TEMPERATURE OF A MOVING SURFACE

[75] Inventors: Marc Auger, Kitimat; Yves Caron, Chicoutimi, both of Canada

[73] Assignee: Alcan International Limited, Montreal, Canada

[ * ] Notice: This patent is subject to a terminal disclaimer.

[21] Appl. No.: 08/873,673

[22] Filed: Jun. 12, 1997

[51] Int. Cl.[7] .................................................. B22D 11/22
[52] U.S. Cl. ..................... 164/452; 164/455; 164/154.7
[58] Field of Search ..................................... 164/452, 455, 164/487, 151.4, 154.6, 155.6, 444, 154.7; 29/407.01, 407.05; 374/166, 179

[56] References Cited

U.S. PATENT DOCUMENTS

| | | | |
|---|---|---|---|
| 3,409,217 | 11/1968 | Gentry . | |
| 3,821,562 | 6/1974 | Davis et al. | 307/117 |
| 3,829,849 | 8/1974 | Stauffer | 340/248 E |
| 4,552,465 | 11/1985 | Anderson | 374/179 |
| 5,061,083 | 10/1991 | Grimm et al. | 374/166 |

FOREIGN PATENT DOCUMENTS

| | | |
|---|---|---|
| 1941816 | 4/1971 | Germany . |
| 1948461 | 4/1971 | Germany . |
| 49-25813 | 7/1974 | Japan . |

OTHER PUBLICATIONS

Patent Abstracts of Japan [vol. 007, No. 125, P–200, May 31, 1983] re JP 58 042940 A.

*Primary Examiner*—Kuang Y. Lin
*Attorney, Agent, or Firm*—Cooper & Dunham LLP

[57] ABSTRACT

Apparatus for measurement of a temperature of a moving metal slab to provide a measured temperature indication corresponding to an actual temperature at a location on the surface of the slab. The apparatus comprises a first temperature measuring sensor mounted to move out of contact with a surface of the slab, and then into contact with the surface at the location, the first sensor generating an output corresponding to a detected temperature when the contact is made with the surface; at least one additional temperature measuring sensor mounted adjacent to the first sensor to move out of contact with the surface of the slab, and then into contact with the surface at the location, the second sensor generating an output corresponding to a detected temperature when the contact is made with the surface; and a comparator for determining whether or not the detected temperatures at the location differ by less than a particular amount, and for providing a measured temperature indication representing the actual temperature of the surface at the location based on one or more of the outputs, only if the detected temperatures differ by less than the predetermined amount. The invention also relates to a corresponding method of measuring the surface temperature.

17 Claims, 3 Drawing Sheets

APPARATUS AND METHOD FOR MEASURING THE TEMPERATURE OF A MOVING SURFACE

BACKGROUND OF THE INVENTION

1. Field of the Invention

This invention relates to an apparatus and method for measuring the temperature of a moving surface. More particularly, the invention relates to such an apparatus and method for measuring the temperature of a moving surface of a metal slab, for example, an aluminum ingot during casting.

2. Description of Related Art

During direct chill (DC) casting of aluminum ingots, the temperature of the ingot surface is controlled by spraying a coolant on the solidified surface of the ingot as it descends from the mould (referred to as secondary cooling). Proper control of this cooling is required to prevent a variety of casting problems and ingot defects. Excessive or insufficient cooling may be responsible for ingot defect formation, such as excessive butt curl, resulting in severe bleeding on short sides of rectangular cross-section ingots, cold folding requiring extra scalping before hot rolling, and cracking caused by excessive thermo-mechanical stresses.

This problem is particularly acute during the start-up phase of such a DC casting process, and a variety of techniques are known to modify the cooling effect of the secondary cooling, such as "pulsed water", as disclosed in U.S. Pat. No. 3,441,079, or gas injection, as disclosed in U.S. Pat. No. 4,693,298. However, these techniques generally involve pre-programming to provide predetermined cooling profiles, and do not use any feedback of ingot conditions to modify the cooling effect. Therefore, they are unable to respond to variations in the coolant properties, mould cooling characteristics, etc.

Related problems arise in a variety of fields which therefore could advantageously use temperature measurements on as-cast strip from a continuous caster, temperature measurements on a slab issuing from a hot mill or temperature measurements on the profile produced from an extrusion press. When these processes in particular are associated with quenching, temperatures change dramatically over short distances.

German patent DE 1,941,816 (assigned to VAW) proposes the use of a temperature measurement sensor which contacts an ingot surface as a means to provide direct temperature feedback to control the coolant application. The apparatus and method are also stated to have applicability in the field of extrusion etc. The sensor is attached to a wheel device which allows repeated contacts to be made between the sensor and the surface at different locations along the ingot as the ingot descends. It is disclosed that the device is used to control coolant flow to compensate for heat flux changes and changes in coolant properties. Such a temperature measurement sensor consists of a pair of contacts of differing metals which, on making contact with the ingot surface, generate a thermal electromotive force (emf) which is representative of the surface temperature at that location. However, this means that the measurement technique relies on uniform surface contact at each location since there is no means of verifying measurement validity, particularly when the temperature varies along the cast ingot, for example, at the start of casting. Furthermore, because of the size of the wheel, the device has limitations as to where it can be used for temperature measurement (for example, there is little room close to a mould surface for a wheeled device to operate), and also limitations as to the spacing between adjacent locations at which the temperature may be measured.

There is therefore a need for a reliable means for measuring the surface temperatures of moving slabs, ingots, or strips, etc., particularly at locations where the temperature may undergo large changes, for example, where a coolant is directed at the surface.

SUMMARY OF THE INVENTION

An object of the invention is to improve the reliability of measurements of temperatures of moving surfaces.

Another object of the present invention is to provide an apparatus and a method for measuring temperatures of moving surfaces that can provide rapid and accurate temperature measurements.

Another object of the invention is to provide an apparatus and method of the above type by means of which unreliable temperature indications can be avoided.

Yet another object of the invention, at least in its preferred forms, is to provide an apparatus for reliably measuring the temperature of a moving surface that can be used in localities in which there is little available space.

According to one embodiment of the invention, there is provided an apparatus for measurement of a temperature of a surface of a moving metal slab to provide a measured temperature indication corresponding to an actual temperature at a location on said surface, said apparatus comprising: a first temperature measuring sensor mounted to move between a first position in which the first sensor is out of contact with a surface of the slab, and a second position in which the first sensor contacts said surface at said location, said first sensor generating an output corresponding to a detected temperature when said contact is made with said surface; a drive mechanism to move said sensor between said first and second positions of said first sensor; at least one additional temperature measuring sensor mounted adjacent to said first sensor to move between a third position in which the at least one additional sensor is out of contact with said surface of the slab, and a fourth position in which the at least one additional sensor contacts said surface at said location, said at least one additional sensor generating an output corresponding to a detected temperature when said contact is made with said surface; a drive mechanism to move said at least one additional sensor between said first and second positions of said at least one additional sensor; and a comparator for comparing said outputs of the first and at least one additional temperature measuring sensors for determining whether or not said detected outputs of said first and at least one additional sensors at said location differ by less than a predetermined amount, and an indicator for providing a measured output indication representing said actual temperature of said surface at said location based on one or both of said outputs, only if said detected temperatures differ by less than said particular amount.

According to another embodiment of the invention, there is provided an apparatus for measurement of a temperature of a moving surface of a metal slab to provide a measured temperature indication corresponding to an actual temperature at a location on said surface, said apparatus comprising: a first temperature measuring sensor selectively movable into contact with or out of contact with said surface at said location, said sensor generating an output when in contact with said surface according to a temperature detected; at least one additional sensor adjacent the said first sensor selectively movable into contact with or out of contact with said surface at said location, said at least one additional sensor generating an output when in contact with said surface according to a temperature detected; a comparator for comparing said outputs of said first and at least one additional temperature sensors and for determining whether such outputs differ by more than a predetermined amount; and an indicator of measured temperature for generating an output corresponding to an actual temperature os said surface at said location based on one or more outputs of said sensors when said outputs of said sensors differ by less than said predetermined amount.

Preferably each sensor is mounted to be selectively movable between a first position where it is out of contact with the surface and a second position where it is in contact with the surface. Preferably each sensor is provided with a drive mechanism for moving the sensor between the first and second positions.

The drive mechanism for the first sensor and said drive mechanism for the at least one additional second sensor are preferably synchronized to move the sensors into contact with the surface at the location at the same time.

The first temperature sensor may be a sheathed thermocouple device consisting of dissimilar metal wires bonded together and contained within a single protective sheath (generally metallic). However, the first temperature sensor preferably is comprised of two point contact probes made of dissimilar metals that can develop an emf when brought into contact with the surface, which is a function of the temperature of the surface at the contact location.

The at least one additional temperature sensor may be a sheathed thermocouple device as in the first temperature sensor, but is preferably comprised of two point contact probes made of dissimilar metals than can develop an emf which is a function of the temperature of the surface at the contact location.

It is preferred that there be only one additional temperature sensor.

It is particularly preferred that the first and only one additional temperature sensors have one of their two point contacts probes in common.

In the most preferred embodiment, the point contacts probes are preferably spaced less than 50 mm apart and most preferably less than 30 mm apart, and are mounted in a common plane.

The dissimilar metals are preferably chromel and alumel alloys, although any pair of metals that can develop a measurable emf may be used. However, preferred alloys will generally be selected on the basis of the signal that develops through the Seebeck effect, and the hardness and corrosion resistance of the alloys. Nickel-based alloys are useful in these applications, and hence Type K (chromel-alumel), Type N (nicrosil-nisil), and Type E (chromel-constantan) are preferred combinations.

The temperature sensors of are preferably brought into simultaneous contact with the moving surface by means of a pneumatic or electrical drive mechanism (piston or solenoid) causing the sensors to move reciprocally in a direction perpendicular to the direction of motion of the moving surface, or at a predetermined angle to the perpendicular, which is less than 45° from the perpendicular. An angled displacement is useful where some obstruction (such as the edge of a DC casting mould or extrusion die) prevents access at the desired measurement location. In the preferred embodiments using pairs of point contact probes form the sensors, the individual point contact probes are brought into contact with the moving surface by means of these pneumatic or electric drive mechanisms.

In these preferred embodiments and in particular where three point contacts are used to form two adjacent sensors, it is preferred that the individual point contact probes have independent suspension so that although they are moved simultaneously towards the surface or away from it, the actual final position of each point contact probe can adjust to non-uniform surfaces. This can be accomplished, for example, by use of separate pneumatic cylinders or electrical solenoids for each point contact probe, driven from a common source, or through the use of spring loading or similar mechanical loading systems. The use of separate pneumatic cylinders is a particularly simple and preferred method.

The point probe contact tips of the preferred embodiments should preferably indent the surface to be measured to ensure good thermal and electrical contact, and the point contact probe tip material, geometry and size, and the load which propels the tip to the surface are preferably chosen to accomplish this. A good thermal and electrical contact ensures fast and accurate temperature response even in the presence of substantial thermal disturbances such as would be encountered in secondary coolant sprays or other quenchant applications.

According to a further embodiment of the invention there is provided a method of measuring a temperature of a moving metal slab to provide a measured temperature indication corresponding to an actual temperature at a location on said surface, said method comprising: contacting a first temperature measuring sensor with said surface of said slab at said location, and measuring an output of said sensor corresponding to a temperature detected; contacting at least one additional temperature measuring sensor with said surface of said slab at said location, and measuring an output of said at least one additional sensor corresponding to a temperature detected; comparing the said outputs of said first and at least one additional sensors; and providing a measured output indication based on one or both of said outputs only if said outputs differ from each other by less than a predetermined amount.

The output indication may be a voltage or current signal (generally a voltage signal) generated by any conventional means from the emf developed by the thermocouple junctions of the sensors or may be further converted to an output equivalent to the temperature through use of known temperature conversion factors.

The first and at least one additional temperature sensors and their respective drive means are preferably mounted within a single support. The support in turn may then be rigid fixed or may be permitted to pivot about an axis.

When such a support is rigidly fixed, the first and at least one additional temperature sensors preferably remain in contact with the surface, and the first and at least one additional temperature measurements are made, while the metal slab moves a distance of 6 mm or less, more preferably 3 mm or less.

When such a support pivots around an axis, the sensors may remain in contact with the moving surface while the metal slab moves greater distances, but for reliability, it is preferred that the respective drive means moves the sensors in a direction lying within 45 degrees of a perpendicular to the direction of motion of the surface during such contact.

The first and at least one additional temperature sensors preferably provide a temperature response of 0.15 seconds or less, preferably 0.10 seconds or less. Temperature response means the time required for the temperature sensor to read within 95% of the final value measured from the time the sensor makes contact with the moving surface.

Alternative means to bring the first and at least one additional temperature sensors into simultaneous contact with the moving slab may be selected if they meet the other requirements of such a system. The sensors may be attached to a rotating wheel with a plurality of equivalent devices such that as the slab moves, successive sets of temperature sensors are brought into contact with the moving slab surface then removed from contact with the surface. Various lever arms may also be employed to achieve the contact if desired. However, in most cases, the use of the "in-out" motion of the preferred embodiments will prove simpler and more convenient.

The moving slab will be a metallic slab but may be a DC cast ingot of any cross-sectional shape or size, a continuously cast slab, strip or rod from a strip caster, a slab from a hot mill or breakdown mill, or an extruded section of any shape from an extrusion press, in particular where accurate temperature measurements are required and these temperatures may be changing quickly with distance, for example, adjacent to the point of application of a quenchant. The moving slab is preferably an aluminum alloy slab.

The moving metal slab is most preferably a metal ingot emerging from a metal casting mould. The method of measuring temperature and controlling cooling is most frequently applied to rectangular cross-section ingots and the ingot temperature is preferably measured at the midpoint of the rolling face of such an ingot.

The invention is described in further detail with reference to the accompanying drawings.

DESCRIPTION OF THE PREFERRED EMBODIMENTS

Figure 1:
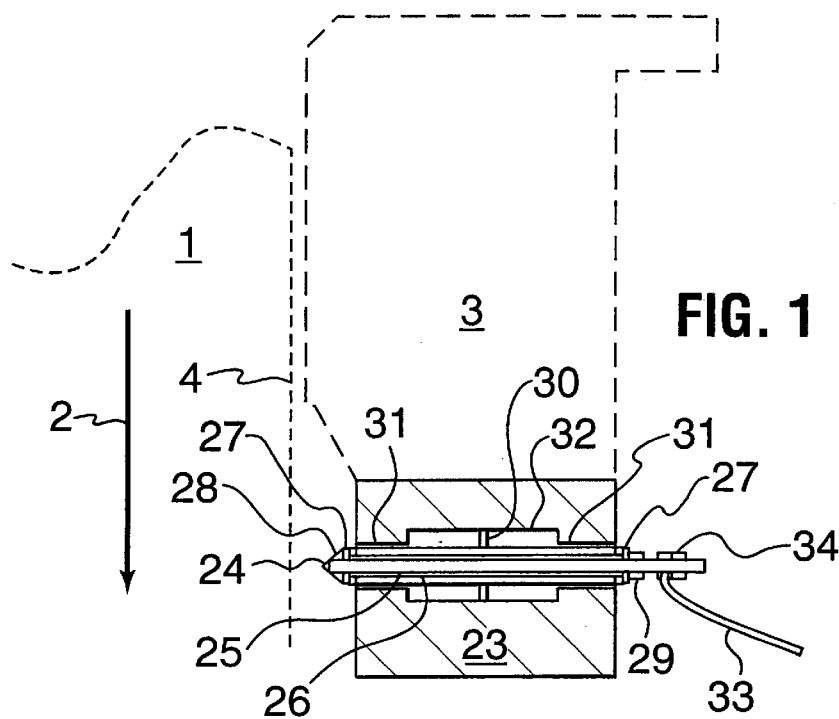
FIG. 1 shows a vertical cross-section of a vertically moving slab using a preferred point contact probe embodiment of the present invention.

FIG. 1 shows, in dotted lines, a slab 1 moving in the direction of the arrow 2. The slab as illustrated represents an ingot emerging from a typical DC casting mould 3 used for casting aluminum ingot. Although not specifically identified, such a mould consists of a casting face, internal coolant passages and a water outlet, such that water can spray on the solidified ingot face. This latter is referred to as "secondary cooling." The slab surface is represented by the surface 4. The slab could also be a billet emerging from an extrusion die, or a continuous cast strip emerging from a strip casting solidification zone Mounted below the casting mould 3 is a metal block 23 which holds a number of point contact probe pneumatic assemblies (one of which is shown in FIG. 1). Each assembly consists of a metallic point contact probe rod 24, surrounded by a plastic insulating sleeve 25 and contained within a second annular steel sleeve 26. These sleeves are held in position on the probe rods by means of insulating Teflon® washers 27 and threaded retaining nuts 28, 29.

Each annular sleeve has a piston gasket 30 mounted on it and is free to move within a annular hole 31, 32 within the block. The annular hole has an enlarged section 32 to accommodate the piston gasket. Each contact probe rod has an electrical signal wire 33 attached to the end remote from the ingot surface by means of locknuts 34.

Figure 2:
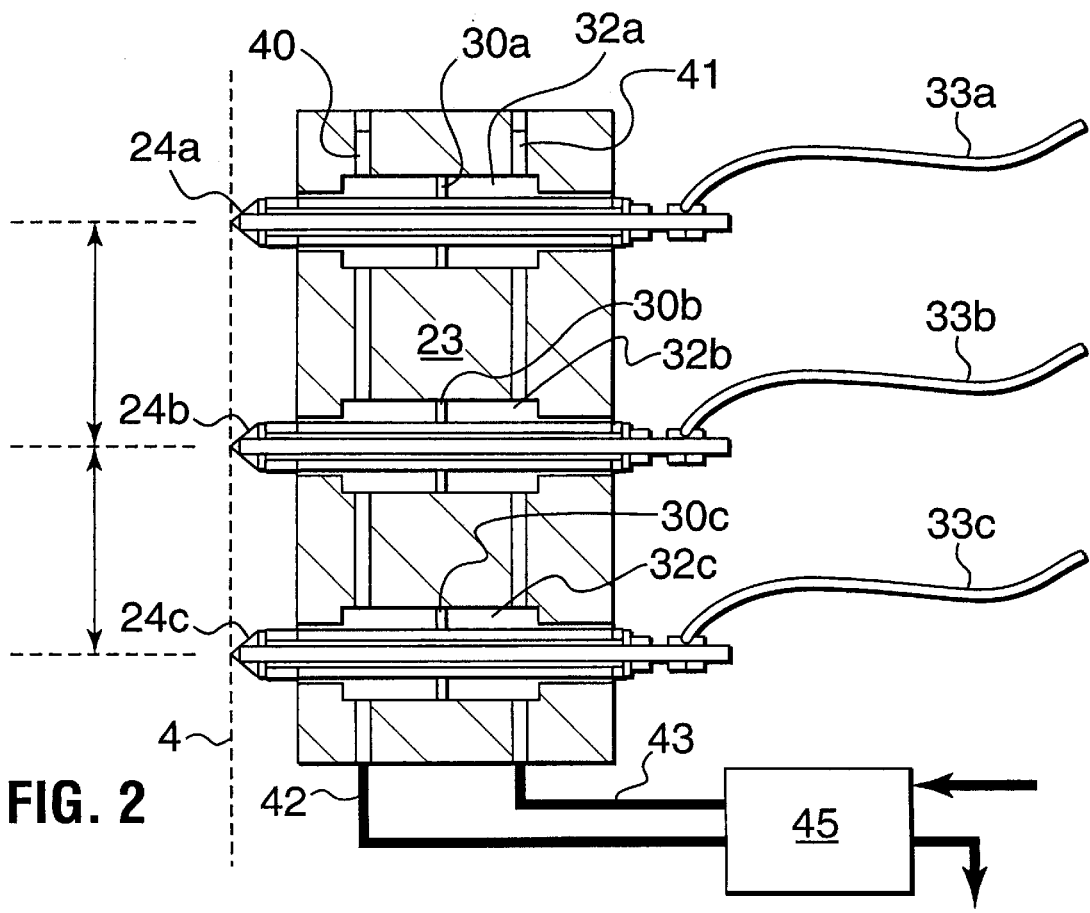
FIG. 2 shows a plan view of the preferred embodiment of the three point contact probes assembly of this invention.

Three such pneumatic assemblies are shown in more detail in FIG. 2 which includes three point contact probes 24a, 24b, 24c, each mounted in an assembly as previously described. Within the steel mounting block 23 air passages 40, 41 are drilled and closed at one end to interconnect the enlarged sections 32a, 32b, 32c of the annular channels in which the probes move. Airline connections 42, 43 are provided at the other end to drive the cylinders in two opposite directions within the cavities. The ends of the point contact probes which are adjacent the slab surface 4 are sharpened to improve contact with the surface. The angle of the sharpened point is selected empirically to reduce the amount of tip wear and flattening that can occur with repeated use. Electrical connections 33a, 33b, 33c are made with the contacts so that the response can be measured using an external circuit described in more detail later.

Point contact probes 24a and 24c are fabricated from one metal and contact 24b is fabricated from a different metal. The corresponding electrical connections are also made of the same metal. Typically, point contact probes 24a and 24c are fabricated from alumel and point contact probe 24b of chromel, but any combination of metals that gives a thermal emf response may be used.

During a typical measurement procedure, the point contact probes 24a, 24b, 24c are positioned so that they lie in a plane such that the tips of the point contact probes when pushed forward by the action of the pneumatic cylinders, touch the surface 4.

In operation, the point contact probes forming the sensors of the present invention are moved simultaneously in the forward direction to make contact with the ingot surface, by simultaneous activation of all three pneumatic cylinders as shown in FIG. 2. Each of the cylinders 32a, 32b, 32c is machined within the block 23 and fed simultaneously by airlines 42 and 43. When pressure is applied to airline 43, and airline 42 is open to atmosphere, all three point contact probes 24a, 24b and 24c are moved towards the ingot surface 4 by the pistons 30a, 30b, 30c. When pressure is applied to airline 42, and 43 is open to atmosphere the three contacts are moved back from the surface. The direction of air flow is controlled by a double acting pneumatic valve 45, attached to a air supply source (not shown). The point contact probe tips are held against the ingot surface for a short period of time and then retracted by the pneumatic cylinders. During the time of contact with the surface, the surface may move as much as 6 mm vertically, preferably only 3 mm or less, and the vertical play in the insulating sleeves allows the point contact probes to engage the surface without scraping or gouging.

Although the three point contact probes are moved against the ingot surface simultaneously, the use of separate pneumatic cylinders permits the point contact probes to conform to ingot surface irregularities. A similar flexibility could be obtained, for example, by use of a single activating cylinder with spring loaded contact tips.

The pneumatic cylinders operate with a pressure of 90 psig. For a chromel or alumel alloy rod 6 mm in diameter with a point angle of about 30°, an adequate force is developed to make a reliable thermal and electrical contact with the ingot surface.

Whilst in contact with the surface, the emf developed between contacts 24a and 24b and between 24b and 24c are measured. Several such measurements are made, generally at a frequency of 40 per second, while the contacts make connection with the surface. Because the contacts are making direct electrical connection with the surface, the measurements stabilize at a final value within less than 0.15 seconds. The emf from the two sensors (formed by the pairs of point contact probes) are converted to equivalent detected temperature based on the known response for the metals used in the point contact probes. The point contact probes are generally positioned less than 30 mm apart so that the intervening aluminum surface between the point contact probes does not affect the measurements. Thus, where chromel and alumel metals are used, the emf developed is typical of that found in a "Type K" thermocouple. The two simultaneously detected emf, converted to a voltage or equivalent temperature are then compared. If they differ by more than about 5%, the measurement is rejected. Otherwise the maximum of the two detected voltages or temperatures is indicated and recorded as being the output most accurately measuring the actual surface temperature at that point. Of course, if desired, the lower detected temperature could be used, or an average of the two could be provided, as the indicated surface temperature, but for greatest accuracy the maximum value is used.

By using this comparative technique, the surface temperature can be reliably determined even when the metallic slab surface is rough and non-uniform and while the surface temperature may be undergoing significant changes as in the very start of the DC casting of an ingot or in critical temperature measurement locations in extrusion processes or continuous strip casting processes. Temperature measurements based on single thermocouple probe or a probe formed by a simple pair of contacts cannot validate a measurement except by comparison to the previous and subsequent measurements and in situations where the surface temperature is changing this cannot be done reliably.

Figure 3:
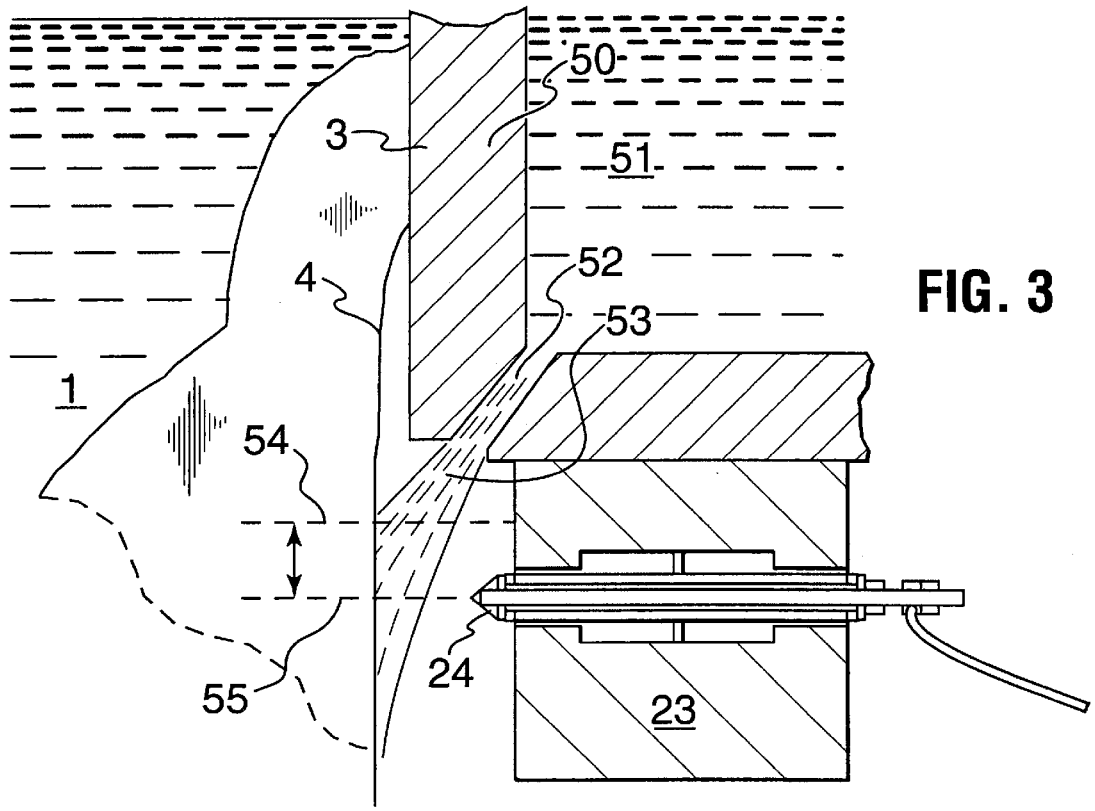
FIG. 3 shows a more detailed view of the embodiment of FIG. 1 showing the preferred position of one of the point contact probes in a DC ingot casting application.

FIG. 3 shows a part of the casting mould 3 corresponding to FIG. 1, with mould face 50 primary coolant channel 51 secondary water outlet 52 secondary water stream 53 and ingot 1. The slab or ingot face emerging from the mould is represented by the surface 4.

During a typical DC casting operation, secondary coolant 53 is discharged from the casting mould against the solidified ingot surface 4 as shown in FIG. 3. The uppermost point at which the coolant stream strikes the ingot surface 54 is referred to as the secondary coolant impingement point and the probes 24 are positioned so that they lie in a horizontal plane such that the tips when pushed forward by the action of the pneumatic cylinders, touch the ingot surface at position 55 which may fall anywhere in a range between 5 mm above the impingement point and 30 mm below the impingement point, preferably between 5 and 15 mm below the impingement point. It has been determined that when the probe is used in this position, the measured temperature is representative of the thermal state of the ingot. If it lies more than 5 mm above the impingement point, then the probe will fail to measure the effects of secondary coolant which are of major importance in controlling the casting. If it lies more than 30 mm below the impingement point, the probe response will be affected by the gradual averaging of temperatures following the application of coolant and will no longer have the sensitivity to show the true effect of coolant on the surface.

The rapid equilibration and frequent temperature measurements permit tracking of surface temperature variations that occur relatively rapidly, for example during pulsed water cooling as used in DC casting of aluminum ingots, where the pulse period may be less than 0.5 seconds. The ability to rapidly equilibrate, combined with the short period of in-out movement and the ability to verify the validity of each measurement as it is made, permits an excellent distance resolution along the slab over which temperatures are being measured. For example, at typical casting speeds for sheet ingot, a distance resolution as low as 0.5 mm is feasible, permitting monitoring of temperature changes over very short distances along an ingot.

Figure 4:
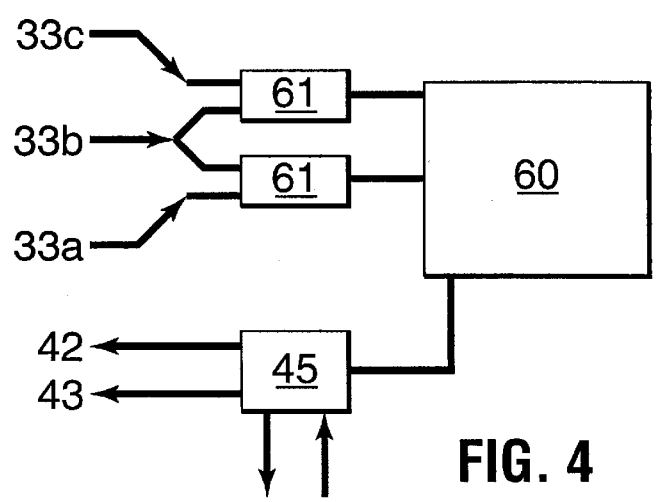
FIG. 4 shows a block diagram of a preferred control and measurement system to be used with the present invention.

A typical circuit to control the movement of the probes and make the coordinated measurements may be described by reference to FIGS. 1 and 2 and the block diagram of FIG. 4. The signal analysis and timing signal are provided by a common digital computer 60. The computer generates a "start" timing signal which activates a four way solenoid 45 which applies air pressure to the common pneumatic connection 43 for all point contact probes to drive the probes into the slab surface. A similar "stop" timing signal causes the solenoid to apply air pressure to connection 42 to reverse movement. The un-used connection (42 or 43) is connected to atmosphere by means of the solenoid.

Continuously operating analogue to digital converters 61 are connected to pairs of contacts 24a, 24b and 24b, 24c of the point contact probes. Connections 33a and 33b feed one such A to D converter and connections 33b and 33c feed the other. The A to D converters are capable of making at least 40 reading per second and converting the emf's read into digital voltage signals representative of detected temperatures. These signals are fed as inputs to the computer 60.

The computer converts the digital inputs from each contact pair into detected temperatures $T_1$ and $T_2$ based on known conversion factors for the contact alloys selected. Digital inputs are accepted from 0.15 seconds following the "start" timing signal until the "stop" timing signal is generated. The data for $T_1$ and $T_2$ may be treated in a variety of ways. In one method, the maximum, minimum and averages of $T_1$ and $T_2$ are determined for the entire time cycle between "start" and "stop" timing signals. If the average values differ by a predetermined amount (for example 5%), the entire cycle is rejected. If they do not, the higher of $T_1$ and $T_2$ maximum, minimum or average will generally be chosen as an indicated surface temperature representing a measurement of the actual surface temperature at the location on the surface of the particular measurement. Alternatively, the values of $T_1$ and $T_2$ may be compared on a measurement by measurement bases (e.g. at a rate of 40 per second) and individual pairs rejected or accepted. The resulting validated temperature reading will generally be displayed on the computer monitor, stored, or printed out. The reading may also be transferred to a control circuit (not shown) used to control some aspect of the process causing the surface temperature. For example, where a coolant is applied to the surface, the temperature reading can be used to control the coolant flow or other parameter. The speed with which the slab emerges from a mould or die may also be varied in response to such a temperature measurement.

The length of the measurement cycle (between "start" and "stop" timing cycles) may be selected to fit operational requirements, provided of course that the probe contacts are not required to move vertically beyond their operating limits. In addition, movement beyond about 3 mm for measurements taken at specific locations with respect to a coolant impingement point may give less representative results than desirable.

It can be appreciated that the same apparatus design considerations can apply to a variety of other slab cooling situations. The effect of coolant application in the case of horizontal casting (including continuous strip casting) or rolling of a metal slab can be monitored by operating the temperature probes in vertical rather than a horizontal plane, and other features of the invention remain substantially unchanged. Monitoring the application of a coolant in a horizontal extrusion press is a similar situation.

Figure 5:
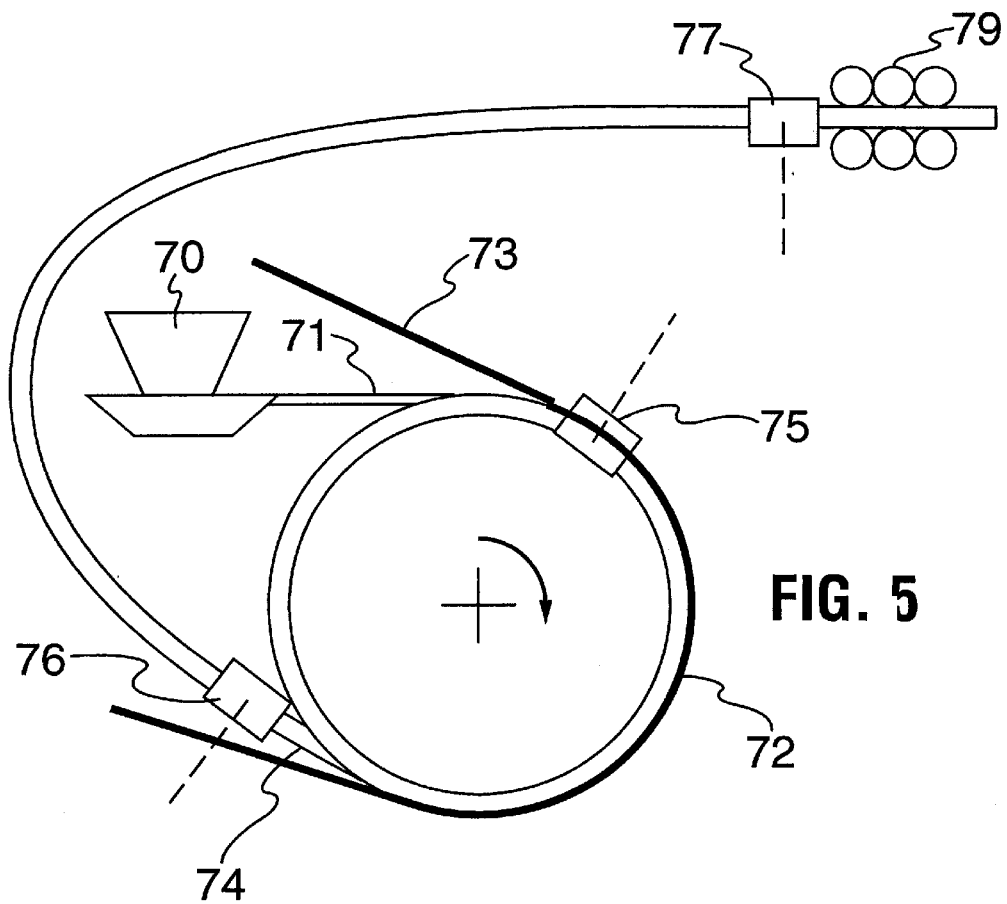
FIG. 5 shows a vertical cross section of a continuous strip casting showing suitable locations for the point contact measurement probes of the present invention.

FIG. 5 shows another application of the temperature measurement device and method of the present application. In this application a "wheel-belt" caster of a conventional design (Properzi or similar) is used. In this case, metal is fed from a furnace (not shown) to a tundish 70 and metal delivery trough 71, into a groove contained within the rim of a casting wheel 72. A continuous metal belt (a portion of which is shown 73) covers the wheel rim over a portion of its circumference. Coolant is applied to the wheel and the covering belt to freeze the metal into a continuous ingot. The ingot cast in this type of machine is generally of square cross-section and is fed through a series of dies 79 following solidification to produce wire or cable stock. At the point of removal of the ingot from the wheel 74, the ingot surface has at least solidified, although the central portion may not be completely solid. The sensors as illustrated in FIGS. 1 and 2 can be fixed at various locations 75, 76 and 77 along the casting path. The direction of movement of the probes against the surface, which may be either the enclosing belt (e.g. at location 75) or the ingot surface itself (e.g. at locations 76, 77) will be perpendicular to the surface at each point, as illustrated by the perpendiculars on FIG. 5. Because of the small size and ability to operate at any orientation, the present invention is suitable for such locations. The speed and reliability of the individual measurements permits its use in the monitoring and control of a continuous casting process even in areas of rapidly changing temperatures.

Figure 6:
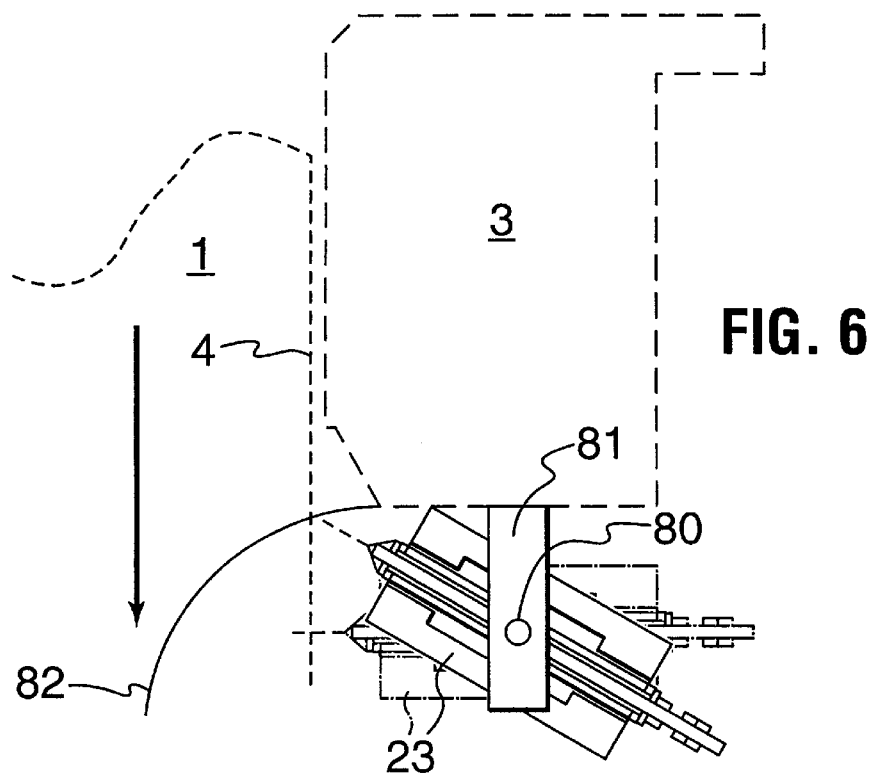
FIG. 6 shows the device of FIG. 1 adapted to provide contact at an angle from the horizontal and providing greater vertical movement as well.

FIG. 6 shows a modification of the device suitable for use in confined spaces or where the slab movement is sufficiently fast that the point contact probes must remain in contact with the surface as the slab moves a greater distance than normally afforded by a fixed mounting. The device (as otherwise described with reference to FIGS. 1 and 2) is contained within a block 23 which is mounted on a pivot 80 with a post 81 attached to the mould 3, rather than being fixed solidly to the mould 3. The pivot is spring loaded so that when the point contact probe is not in contact with the surface 4, the block 23 is held by the spring against the bottom of the mould at a resting point 82. In this first extreme position the point contact probes, when brought against the surface 4 will connect at a point higher up than otherwise possible, and this permits access in cases where such confined access is required. Furthermore, because of the pivot arrangement, and the pneumatic movement system, the point contact probes can remain in contact with the surface as the entire block pivots from the first extreme position to a position in the illustrated solid line configuration in which the block is essentially horizontal (the "second" extreme position shown in dashed lines). When the point contact probes are retracted, the spring loaded pivot 80 returns the assembly to its original position. The second extreme position may, if necessary be at an angle below the horizontal. As long as the point contact probes are positioned at an angle of less than about 45 degrees from a perpendicular to the slab surface, reliable measurements may be obtained. That is the first and second extreme positions should be 45 degrees or less from the perpendicular to the slab surface for which the temperature is being measured. Thus the point contact probes can remain in contact with the surface as the slab moves a greater distance than otherwise possible, permitting measurements where the slab is moving at a faster rate. In different configurations the weight of the block itself may be used to return it to the first extreme position once the point contact probes are retracted from the surface. Spring loading has an advantage in that the same assembly may be used in any orientation and at a wide variety of locations my merely providing a stop to retain the block at a point corresponding to location 82.

What we claim is:

1. Apparatus for measurement of a temperature of a moving surface of a metal slab to provide a measured temperature indication corresponding to an actual temperature at a location on said surface, said apparatus comprising:

a first temperature measuring sensor mounted to move between a first position in which the first sensor is out of contact with a surface of the slab, and a second position in which the first sensor contacts said surface at said location, said first sensor generating an output corresponding to a detected temperature when said contact is made with said surface;

a drive mechanism to move said sensor between said first and second positions of said first sensor;

at least one additional temperature measuring sensor mounted adjacent to said third sensor to move between a first position in which the second sensor is out of contact with said surface of the slab, and a fourth position in which the second sensor contacts said surface at said location, said at least one additional sensor generating an output corresponding to a detected temperature when said contact is made with said surface;

a drive mechanism to move said at least one additional sensor between said first and second positions of said at least one additional sensor; and a comparator for comparing said outputs of the first and at least one additional measuring sensors for determining whether or not said detected temperatures of said first and at least one additional sensors at said location differ by less than a predetermined amount, and an indicator for providing a measured temperature indication representing said actual temperature of said surface at said location based on one or more of said outputs, only if said detected temperatures differ by less than said predetermined amount.

2. The apparatus of claim 1, wherein said drive mechanism for said first sensor and said drive mechanism for said at least one additional sensor are synchronized to move said first and said at least one additional sensors into contact with said surface at said location at the same time.

3. The apparatus of claim 1, wherein said first sensor and said at least one additional sensor each have two spaced point contact probes made of dissimilar metals for generating electromotive force which is a function of said actual temperature of said surface when brought into contact with said surface.

4. The apparatus of claim 3, wherein said point contact probes of each sensor are spaced less than 50 mm apart.

5. The apparatus of claim 3, wherein said point contact probes of each sensor are spaced less than 30 mm apart.

6. The apparatus of claim 3, wherein said dissimilar metals are chromel and alumel alloys.

7. The apparatus of claim 3, wherein each of said point contact probes has independent suspension to permit said first and at least one additional sensors to conform to surface irregularities.

8. The apparatus of claim 3, wherein there is only one additional temperature sensor and one point contact probe of each said sensor is common to both.

9. The apparatus of claim 1, wherein each of said first and said at least one additional sensors is mounted to be moved by said respective drive means directly towards or away from said surface perpendicular to a direction of motion of said surface or at an angle to said direction that is less than 45°.

10. The apparatus of claim 9, wherein said drive mechanism for said first and second sensor are selected from the group consisting of pneumatic drive mechanisms and electrical drive mechanisms.

11. An apparatus of claim 1, wherein said first and at least one additional temperature measuring sensors and their respective drive means are mounted in a pivoting support so that the sensors may remain in contact with the moving surface for a time effective for temperature sensing as a result of pivoting of said support in a direction of movement of said surface.

12. An apparatus for measurement of a temperature of a moving surface of a metal slab to provide a measured temperature indication corresponding to an actual temperature at a location on said surface, said apparatus comprising:

a first temperature measuring sensor selectively movable into contact with or out of contact with said surface at said location, said sensor generating an output when in contact with said surface according to a temperature detected;

at least one additional sensor adjacent the said first sensor selectively movable into contact with or out of contact with said surface at said location, said at least one additional sensor generating an output when in contact with said surface according to a temperature detected;

a comparator for comparing said outputs of said first and at least one additional temperature sensors and for determining whether such outputs differ by more than a predetermined amount; and an indicator of measured temperature for generating an output corresponding to an actual temperature of said surface at said location based on one or more outputs of said sensors when said outputs of said sensors differ by less than said predetermined amount.

13. A method of measuring a temperature of a surface of a moving metal slab to provide a measured temperature indication corresponding to an actual temperature at a location on said surface, said method comprising:

contacting a first temperature measuring sensor with said surface of said slab at said location, and measuring an output of said sensor corresponding to a temperature detected;

contacting at least one additional temperature measuring sensor with said surface of said slab at said location, and measuring an output of said at least one additional sensor corresponding to a temperature detected;

comparing the said outputs of said first and at least one additional sensors; and providing a measured temperature indication based on one or more of said outputs only if said outputs differ from each other by less than a predetermined amount.

14. A method according to claim 13, wherein said first and at least one additional temperature sensors are mounted in a support which is rigidly fixed, and remain in contact with said surface only for a period of time during which said metal slab moves a distance of 6 mm or less.

15. A method according to claim 13, wherein said first and at least one additional temperature sensors are mounted in a support which is rigidly fixed and remain in contact with said surface only for a period of time during which said metal slab moves a distance of 3 mm or less.

16. A method according to claim 13, wherein said first and at least one additional temperature sensors provide a temperature response of 0.15 seconds or less.

17. A method according to claim 13, wherein said first and at least one additional temperature sensors provide a temperature response of 0.10 seconds or less.

* * * * *